United States Patent
Bianchi et al.

(10) Patent No.: US 11,004,123 B2
(45) Date of Patent: May 11, 2021

(54) METHOD FOR TRADING GOODS ON A COMPUTER NETWORK BASED ON IMAGE PROCESSING FOR INTEREST, EMOTION AND AFFINITY DETECTION

(71) Applicant: INTERNATIONAL BUSINESS MACHINES CORPORATION, Armonk, NY (US)

(72) Inventors: Silvia Cristina Sardela Bianchi, Sao Paulo (BR); Victor Fernandes Cavalcante, Sao Paulo (BR); Paulo Marques Caldeira Junior, Sao Paulo (BZ); Sergio Varga, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/267,049

(22) Filed: Feb. 4, 2019

(65) Prior Publication Data
US 2019/0171970 A1 Jun. 6, 2019

Related U.S. Application Data

(62) Division of application No. 14/876,664, filed on Oct. 6, 2015, now Pat. No. 10,223,645.

(51) Int. Cl.
  *G06Q 30/06* (2012.01)
  *G06N 20/00* (2019.01)
(52) U.S. Cl.
  CPC ............ *G06Q 30/06* (2013.01); *G06N 20/00* (2019.01); *G06Q 30/0601* (2013.01);
  (Continued)

(58) Field of Classification Search
  None
  See application file for complete search history.

(56) References Cited

U.S. PATENT DOCUMENTS 5,659,731 A 8/1997 Gustafson
8,439,527 B2 7/2013 Van Coppenolle et al.
(Continued)

FOREIGN PATENT DOCUMENTS

WO WO2008134707 A2 11/2008

OTHER PUBLICATIONS

Tran, Van Ngoc, "Barter Online Network," CRIS Bulletin, Feb. 2015, http://archive.sciendo.corn/CRIS/cris.2015.2015.issue-2/cris-2015-0009/cris-2015-0009.pdf (Year: 2015).*
(Continued)

*Primary Examiner* — Nicholas D Rosen
(74) *Attorney, Agent, or Firm* — F. Chau & Associates, LLC

(57) ABSTRACT

A system for trading goods over a computer network based on image processing includes an image processor that analyzes a picture received from a user to build a description of entities in the picture and correlations among the entities, a description interpreter that analyzes the description to determine an underlying message in the picture and detect information regarding the user's interests, emotions and affinities to goods and services, wherein the information is stored with the user's profile, the user's list of items to trade, and the user's past transaction history, and a trade matching component that uses the user's profile and produces a ranked list of other users with items to trade, or intermediary trade steps, when another user initiates a new trading transaction.

9 Claims, 11 Drawing Sheets

(52) U.S. Cl.
CPC ..... *G06Q 30/0613* (2013.01); *G06Q 30/0619* (2013.01); *G06Q 30/0615* (2013.01); *G06Q 30/0617* (2013.01)

(56) References Cited

U.S. PATENT DOCUMENTS

| | | | |
|---|---|---|---|
| 8,909,583 | B2 | 12/2014 | Wilson et al. |
| 9,384,422 | B2 | 7/2016 | Di et al. |
| 9,443,167 | B2* | 9/2016 | Movellan ........... H04N 5/23219 |
| 9,639,806 | B2 | 5/2017 | Zhang et al. |
| 9,697,232 | B2 | 7/2017 | Goodwin et al. |
| 10,223,645 | B2* | 3/2019 | Sardela Bianchi .... G06Q 30/06 |
| 2005/0273720 | A1* | 12/2005 | Cochran .......... G05B 19/41875 715/751 |
| 2006/0064409 | A1 | 3/2006 | Hardwick |
| 2006/0274943 | A1* | 12/2006 | Abdulkader ....... G06K 9/00436 382/186 |
| 2007/0244772 | A1* | 10/2007 | Boesel ............... G06Q 30/0601 705/26.1 |
| 2008/0080743 | A1* | 4/2008 | Schneiderman ..... G08B 13/196 382/118 |
| 2011/0196760 | A1 | 8/2011 | Howard et al. |
| 2012/0259785 | A1 | 10/2012 | Ha |
| 2014/0108135 | A1 | 4/2014 | Osborn |
| 2015/0002692 | A1* | 1/2015 | Cabral ................... H04N 9/735 348/223.1 |
| 2015/0036934 | A1* | 2/2015 | Movellan ............. G06K 9/6202 382/197 |
| 2015/0286898 | A1 | 10/2015 | Di et al. |
| 2015/0294191 | A1 | 10/2015 | Zhang et al. |
| 2016/0140451 | A1 | 5/2016 | Li et al. |
| 2016/0275372 | A1 | 9/2016 | Goodwin et al. |
| 2017/0098170 | A1 | 4/2017 | Sardela Bianchi et al. |

OTHER PUBLICATIONS

Novia Dwi Resti, et al., "The Psychological Effect of Uploading Food Picture on Social Medial to Willingness to Dine Out," Journal of Social and Development Sciences, vol. 4, No. 7, pp. 316-324, Jul. 2013.

Chih-Mao Huang, et al., "Cultural Influences on Facebook Photographs," International Journal of Psychology, 2013, vol. 48, No. 3, pp. 334-343.

Girish Kulkarni, et al., "Babytalk: Understanding and Generating Simple Image Descriptions," IEEE Transactions on Pattern Analysis and Machine Intelligence, vol. 35, No. 12, Dec. 2013.

Ratsimor, O.V., Opportunistic Bargaining of Digital Goods and Services in Pervasive Environments, Doctoral Dissertation, University of Maryland, 2007.

* cited by examiner

1

METHOD FOR TRADING GOODS ON A COMPUTER NETWORK BASED ON IMAGE PROCESSING FOR INTEREST, EMOTION AND AFFINITY DETECTION

CROSS REFERENCE TO RELATED UNITED STATES APPLICATIONS

This case is a divisional of, and claims priority from, U.S. patent application Ser. No. 14/876,664 of Sardela Bianchi, et al., filed on Oct. 6, 2015 in the U.S. Patent and Trademark Office, the contents of which are herein incorporated by reference in their entirety.

BACKGROUND

Technical Field

Embodiments of the present disclosure are directed to methods and systems for trading goods over a computer network.

Discussion of the Related Art

Barter or swap sites are used to trade items, goods or services over a computer network, such as the Internet. Users negotiate among each other what they have in exchange, such as used/new product or services, and to what they want to acquire. In such systems, the user searches for what is wanted to try to find users interested in their products and at the same time exchange them for something valuable. As an alternative to this mechanism, points can be exchanged for a product that the user can spend to acquire new items or services. So, these systems evaluate the market value of the item and give points, system's currency or loans, which is equivalent to money, that can be used to buy new items. In the latter situation, a product's value is determined by the market value and does not consider the interest from other users. This may inhibit the transaction/swap from being completed because neither parties have reached a consensus value. There are other trading sites on the Internet that use action mechanisms where the users give value to products based on the amount that they are willing to pay. However, even though a user may give a high value for something that has a low value in the market, the matching is by chance and liquidity is low. For example, FIG. 1 illustrates a scenario where a trading item, such as a soccer ball 10 used in the World Cup 2014, may have a higher value for a soccer fan 11 than a regular person. So, the product owner 12 may reach a higher value exchange that considers customer's affinity and emotion to the product than by considering the market value or production costs.

SUMMARY

Exemplary embodiments of the disclosure as described herein generally include systems and methods for trading goods over a computer network based on image processing for interest, emotion and affinity detection.

According to an embodiment of the disclosure, there is provided a system for trading goods over a computer network based on image processing, including an image processor that analyzes a picture received from a user to build a description of entities in the picture and correlations among the entities, a description interpreter that analyzes the description to determine an underlying message in the picture and detect information regarding the user's interests, emotions and affinities to goods and services, wherein the information is stored with the user's profile, the user's list of items to trade, and the user's past transaction history, and a trade matching component that uses the user's profile and produces a ranked list of other users with items to trade, or intermediary trade steps, when another user initiates a new trading transaction.

According to a further embodiment of the disclosure, the system includes a database that stores the information regarding the user's interests, emotions and affinities to goods and services, with the user's profile, the user's list of items to trade, and the user's past transaction history.

According to a further embodiment of the disclosure, the description interpreter uses a machine learning algorithm that detects the user's interests, emotions and affinities to goods and services, wherein the machine learning algorithm is trained using descriptions and interpretations of a set of pictures to produce an inference function that can analyze new pictures from user sources.

According to a further embodiment of the disclosure, the description interpreter uses natural language processing to analyze the description.

According to a further embodiment of the disclosure, the image processor uses computer vision algorithms to build the description of entities in the picture and correlations among the entities, wherein said computer vision algorithms include conditional random fields for image segmentation and label prediction, convolution neural network for feature extraction, and a support vector machine for classification.

According to a further embodiment of the disclosure, the system includes a dictionary, wherein the description interpreter uses a text analyzer to extract and evaluate each word in the description created by the image processor, compare each word with the dictionary, and evaluate and weight each word based on a pre-defined set of categories that define the user's interests, emotions and affinities to goods and services.

According to another embodiment of the disclosure, there is provided a non-transitory program storage device readable by a computer, tangibly embodying a program of instructions executed by the computer to perform the method steps for detecting intentions and motivations associated with items to trade over a computer network, the method including analyzing a picture received from a user to detect information items regarding the user's interests, emotions and affinities to goods and services, detecting for each information item and associated picture a list of attributes that express sentiment, personal motivations, values and life events that affect the user's trading decision for each item, calculating an affinity/emotion score for each item in the item's list of attributes and classifying the score into pre-defined set of classes, and adding each item and its associated affinity/emotion score to a list of items that the user is interested in trading.

According to a further embodiment of the disclosure, analyzing the picture comprises building a description of entities in the picture and correlations among the entities, and analyzing the description to detect an underlying message in the picture and information regarding the user's interests, emotions and affinities to goods and services.

According to a further embodiment of the disclosure, the description is analyzed using natural language processing.

According to a further embodiment of the disclosure, building a description of entities in the picture and correlations among the entities comprises using computer vision algorithms to build the description of entities in the picture and correlations among the entities, wherein said computer vision algorithms include conditional random fields for image segmentation and label prediction, convolution neural network for feature extraction, and a support vector machine for classification.

According to a further embodiment of the disclosure, the method includes using a text analyzer to extract and evaluate each word in the description created by the image processor, compare each word with a dictionary, and evaluate and weight each word based on a pre-defined set of categories that define the user's interests, emotions and affinities to goods and services.

According to a further embodiment of the disclosure, analyzing the description comprises using a machine learning algorithm that detects the user's interests, emotions and affinities to goods and services, wherein the machine learning algorithm is trained using descriptions and interpretations of a set of pictures to produce an inference function that can analyze new pictures from user sources.

According to another embodiment of the disclosure, there is provided a non-transitory program storage device readable by a computer, tangibly embodying a program of instructions executed by the computer to perform the method steps for trading on a computer network, the method including receiving from a first user a request to trade a first item, retrieving a first list of users with intention to acquire the first item from the first user, ranking users in the first list of users based on a user affinity/emotion score for each user, wherein the user affinity/emotion score is higher than a first predefined threshold, retrieving a first list of items that the first user has intention to acquire, ranking items in the first list of items based on an item affinity/emotion score for each item, wherein the item affinity/emotion score is higher than a second predefined threshold, retrieving for each user in the first list of users a second list of items that each said user has to trade, adding a second item in the second list of items, the user and affinity/emotion score associated with said second item to a trade list, if said second item is also in the first list of items and if the item affinity/emotion score of said second item is higher than the second predetermined threshold, and ranking the items in the trade list based on the item affinity/emotion score of each item.

According to a further embodiment of the disclosure, the method includes broadcasting the ranked list of items to each user in the trade list.

According to a further embodiment of the disclosure, the method includes, if the second item in the second list of items is not in the first list of items, retrieving a second list of users with intention to acquire the second item, ranking each user in the second list of users based on a user affinity/emotion score for each said user, wherein the user affinity/emotion score higher than the first threshold, retrieving for each user in the second list of users a third list of items that each said user has to trade, adding an item in the third list of items, the user and affinity/emotion score associated with said item to the trade list, if said item is also in the first list of items, and ranking the items in the trade list based on the affinity/emotion score of each item.

DETAILED DESCRIPTION OF EXEMPLARY EMBODIMENTS

Figure 1:
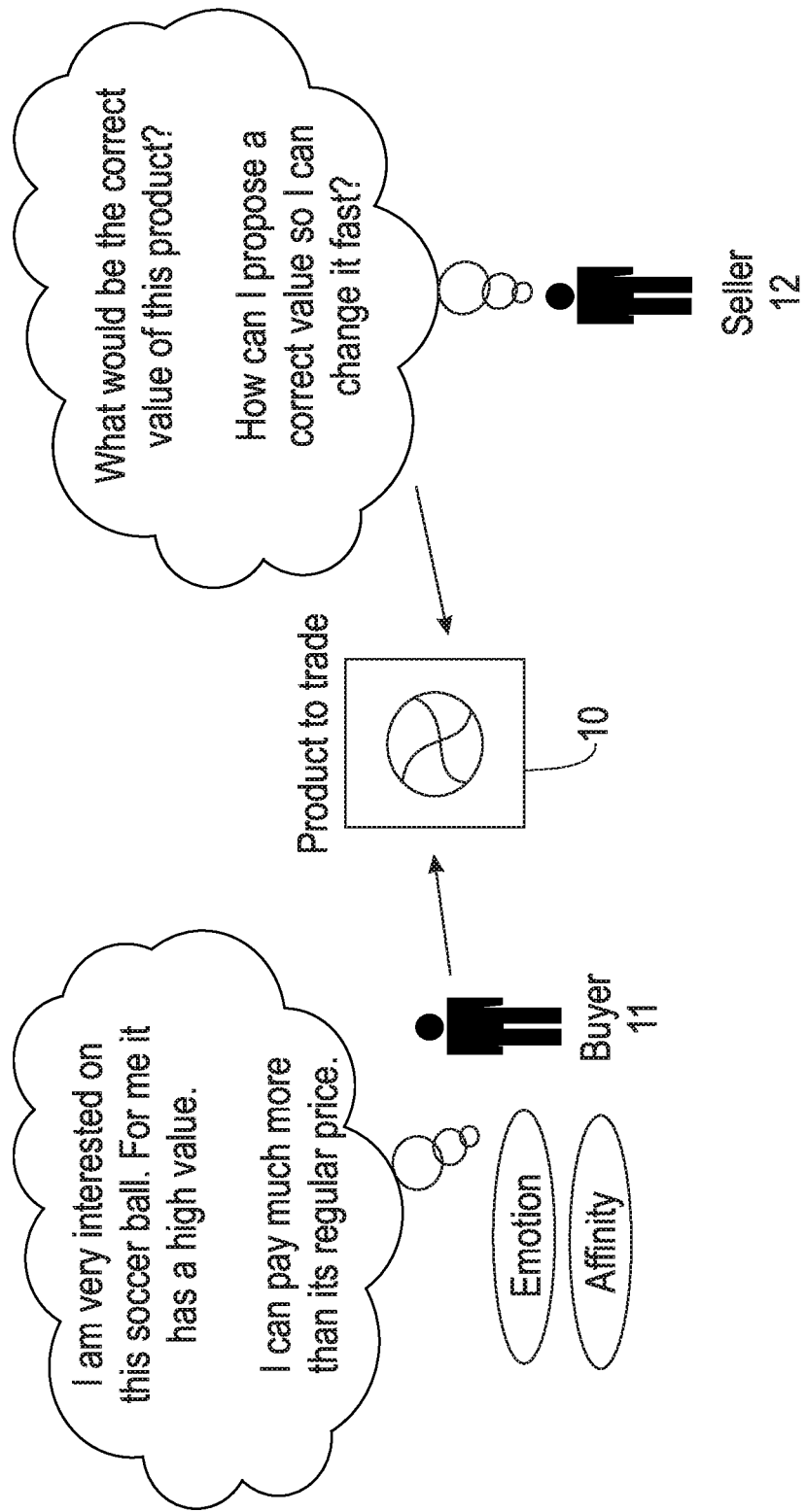
FIG. 1 illustrates a scenario where a trading item may have a higher value for one person than another person, according to an embodiment of the disclosure.

Exemplary embodiments of the disclosure as described herein generally include methods for trading goods over a computer network based on image processing for interest, emotion and affinity detection. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

As used herein, the term "image" or "picture" refers to multi-dimensional data composed of discrete 2-dimensional image elements, such as pixels. Although an image can be thought of as a function from $R^2$ to R or $R^3$, methods of the disclosure are not limited to such images, and can be applied to images of any dimension, e.g., a 2-dimensional picture or a 3-dimensional volume. The terms "digital" and "digitized" as used herein will refer to images in a digital or digitized format acquired via a digital acquisition system or via conversion from an analog image.

Embodiments of the present disclosure can provide a system and method to trade items over a computer network based on the emotion and personal motivations/values attached to the item. A system according to an embodiment of the disclosure can explore pictures posted by users on social media/networks, blogs, chats or other external sources to detect a user's interests, emotions, motivations and values. This information is used by the system to recommend a set of users that would be highly interested in the item. In case the owner of the item does not find an item that matches his/her interests, a system according to an embodiment of the disclosure can propose a set of intermediary trades to maximize the matching.

Figure 2:
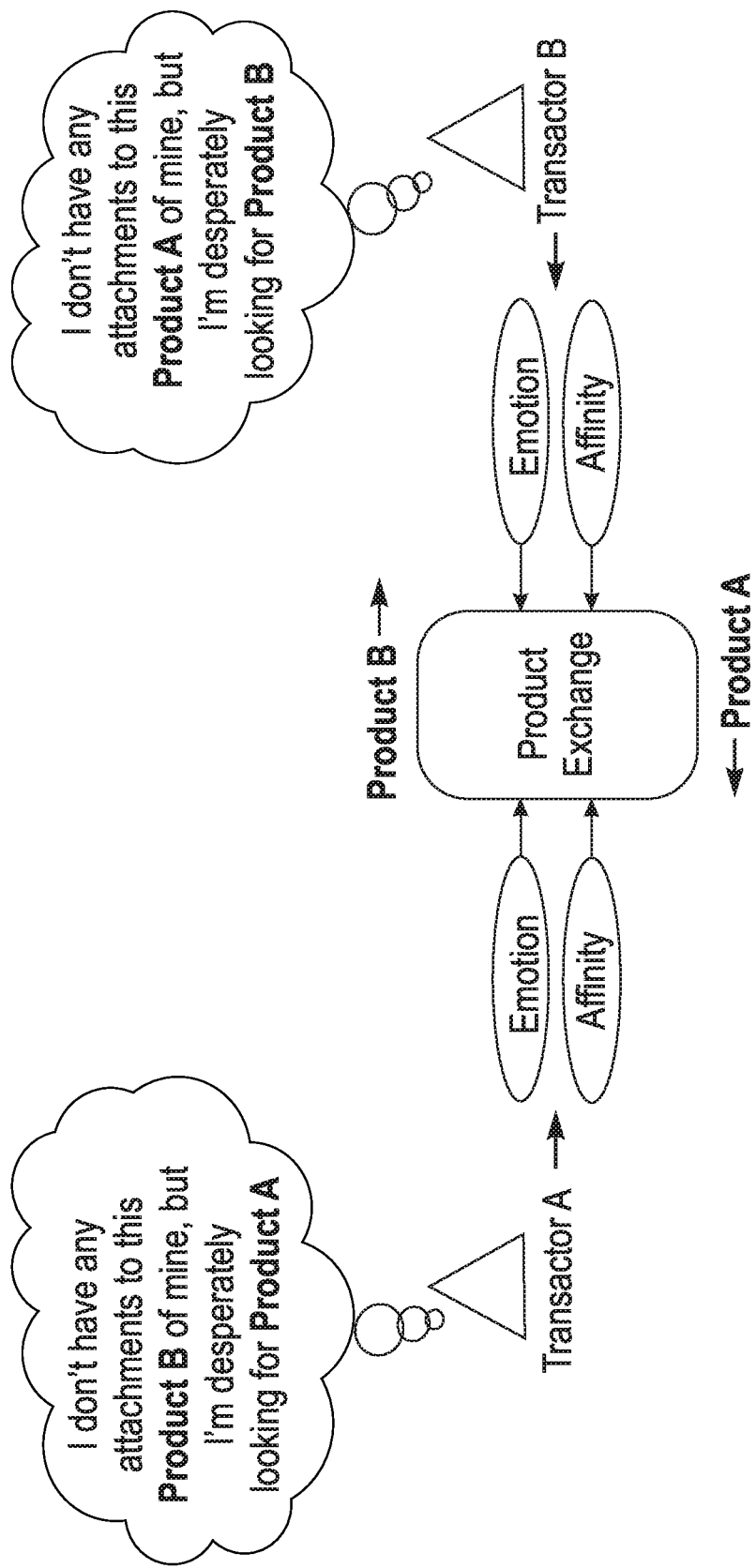
FIG. 2 illustrates a scenario in which the participants both possess products that are neutral to them but are desired by the other participant, according to an embodiment of the disclosure.

FIG. 2 illustrates a scenario in which the participants, Transactor A and Transactor B, both possess products that are neutral to them but are desired by the other transactor, so they exchange it in a high personal value motivated trade, where neither transactor considers market price but only their emotion towards those products.

Figure 3:
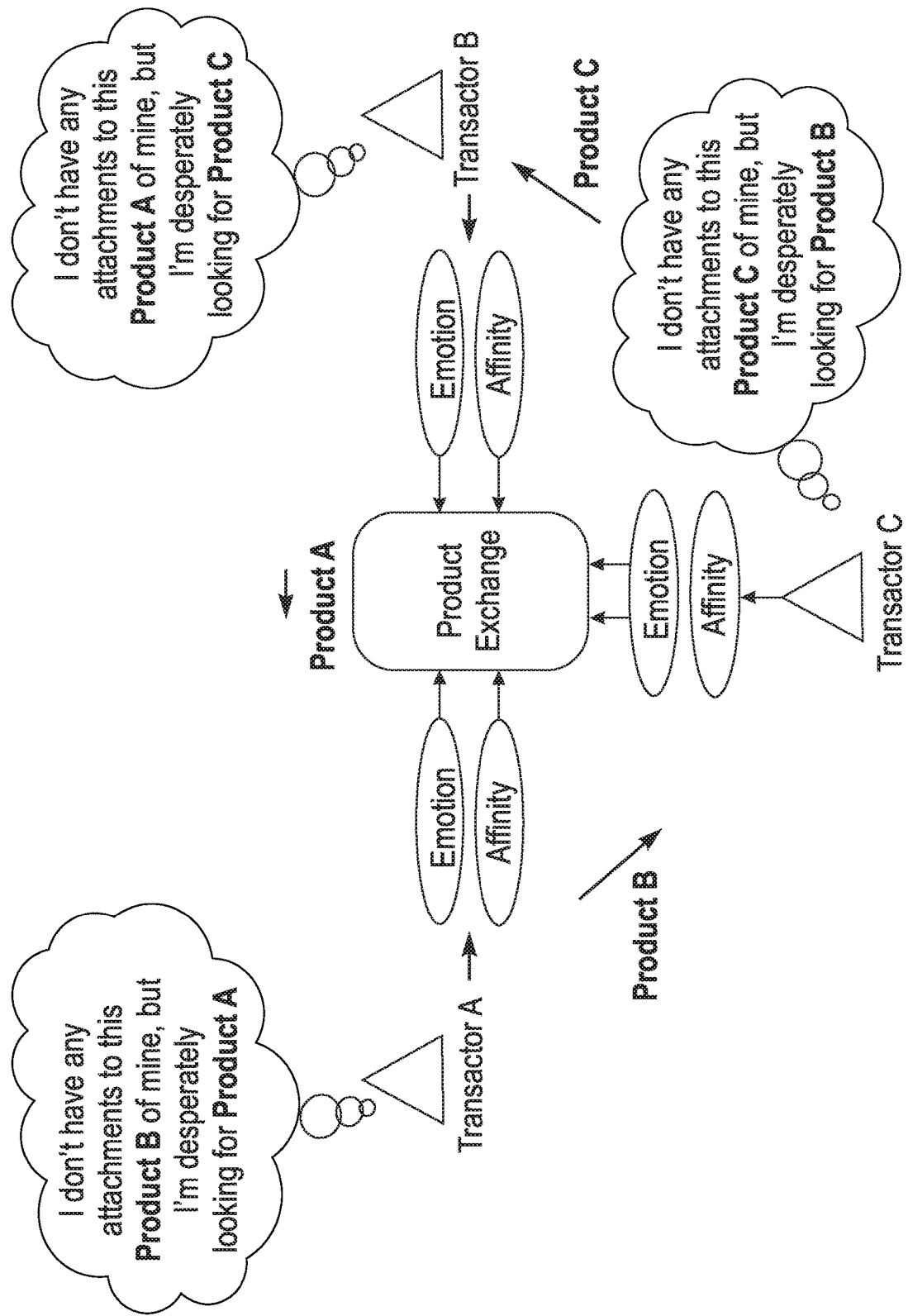
FIG. 3 illustrates a three participant trade of a system according to an embodiment of the disclosure.

FIG. 3 illustrates a value proposition of a system according to an embodiment of the disclosure, where a three participant trade is successfully executed in an all-win situation due to a intermediary trade. In this figure, Transactor A possesses product B, but desires product A; Transactor B possesses product A but desires product C; and Transactor C possesses product C but desires product B. A product exchange system according to an embodiment of the disclosure can facilitate a 3-way exchange Transactor A acquires Product A from Transactor B; Transactor B acquires product C from Transactor C; and Transactor C acquires product B from Transactor A.

A product exchange system according to an embodiment of the disclosure can expedite and expand trades between buyers and sellers, provide a better defined value of the product for a user, provide a personal value oriented approach to product exchanges, and can be extended to other areas, such as crowdfunding or peer-to-peer lending, based on affinity and emotion towards the project or product to be funded.

Figure 4:
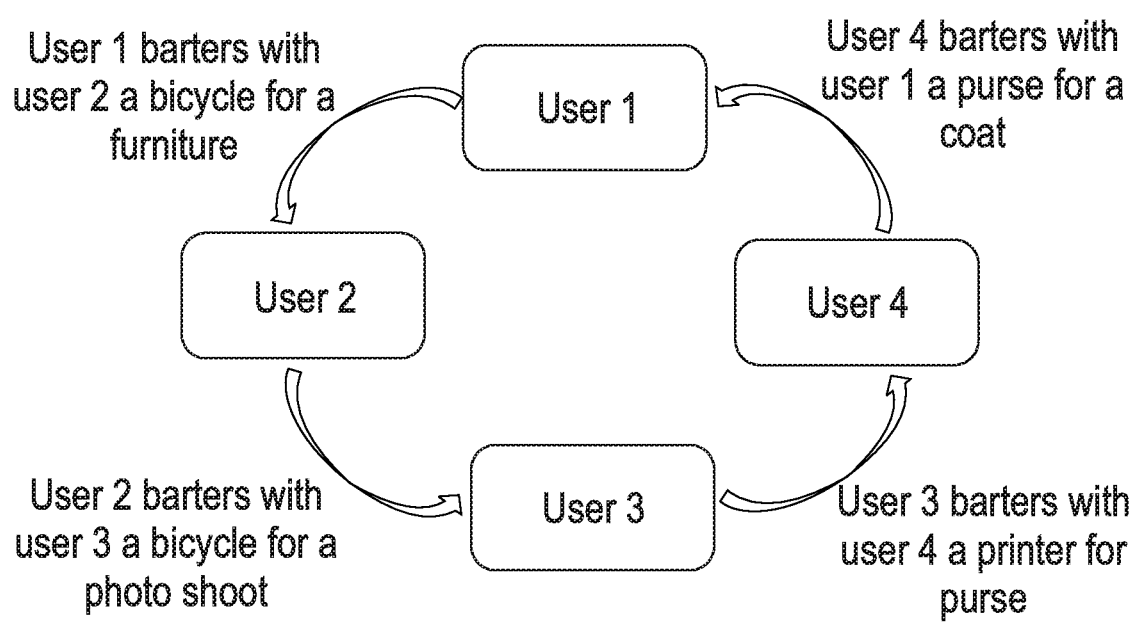
FIG. 4 illustrates another scenario according to an embodiment of the disclosure.

FIG. 4 illustrates another scenario according to an embodiment of the disclosure. Bartering or swapping sites allow users to trade items, goods or services. Usually, the users trade for profit something that they no longer need or desire for something that they do need or desire. In this scenario, users negotiate with each other what they have in exchange to what they want to acquire. Users must search what is wanted to try to find users interested in their products and at the same time exchange for something valuable. However, the swap is based on the market value and not on personal motivations and interest. For example, referring to FIG. 4, User 1 exchanges a bicycle for furniture with User 2, who will exchange the bicycle for a photo shoot with User 3. Then, User 3 exchanges a printer for a purse with User 4, and User 4 exchanges the purse for a coat with User 1. These transactions involve negotiation between the parties that can be assisted by a system according to an embodiment of the disclosure.

In some situations, it may be challenging to negotiate and achieve a consensus, such as when a party is not interested in a product that a user has to offer. However, there may be an intermediary user that has an item that the final user is interested and that is interested on the item of the first party. For example, suppose that User 4 wants a coat and has a printer, but User 1 has the coat but has no interest in a printer. But User 1 would be interested on a purse. So, if User 4 swaps the printer for a purse with User 3, then User 4 can exchange the purse for a coat with User 1. So, a system according to an embodiment of the disclosure can maximize the trade by analyzing the items/goods/services interests, emotions, and affinity to recommend a user or a set of intermediary users (or trades) to trade the item.

Figure 5:
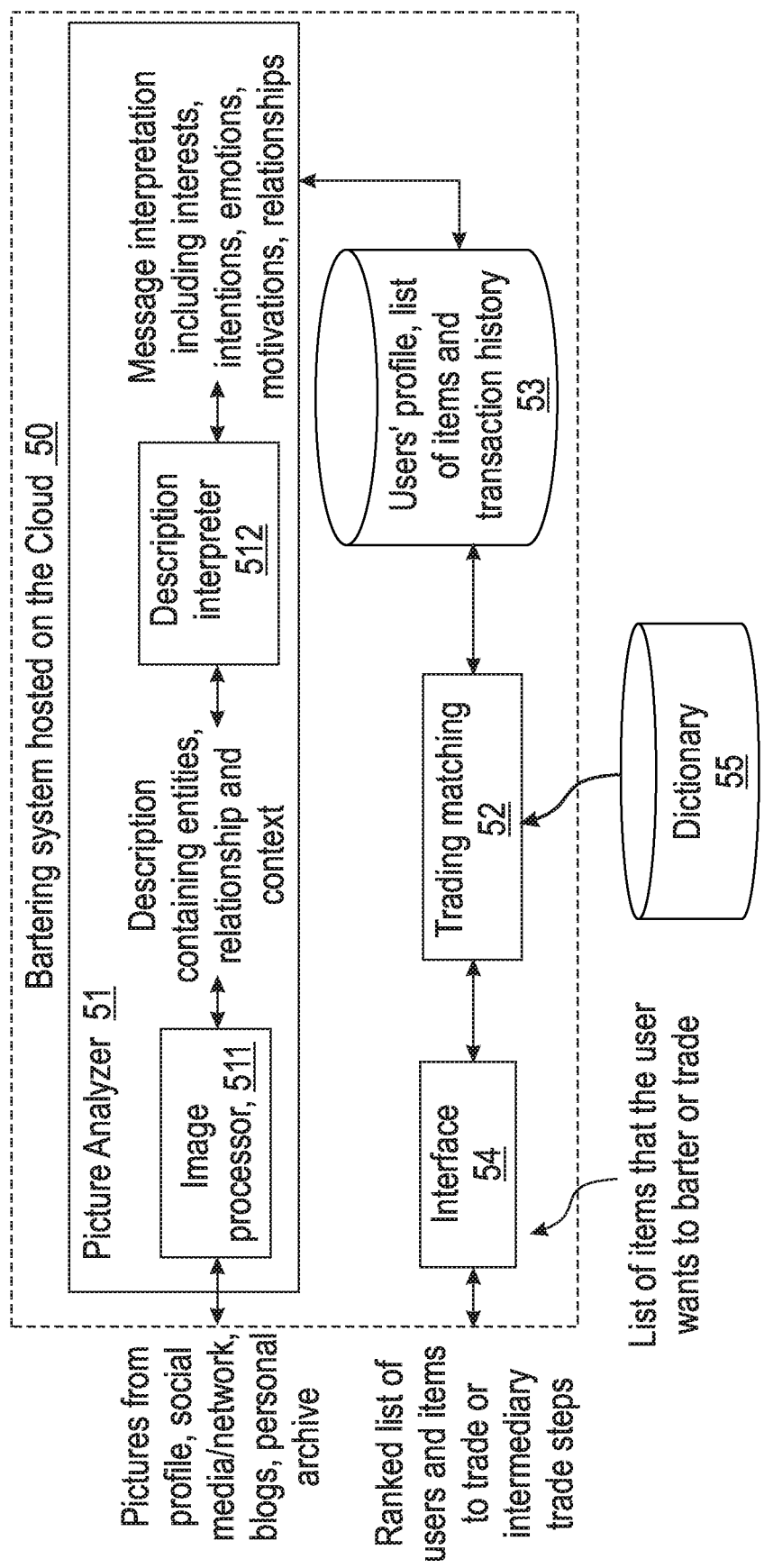
FIG. 5 is a block diagram of a system according to an embodiment of the disclosure.

FIG. 5 is a block diagram of a system according to an embodiment of the disclosure. A system 50 according to an embodiment of the disclosure includes a picture analyzer 51 and a trading matching component 52, and a database 53 containing users' profiles, list of items to trade and transaction history. The picture analyzer 51 includes an image processor 511 and a description interpreter 512, and analyses pictures from the database 53 and from external data sources, such as social media, social networks, blogs, chats and personal archives, to detect user's interests, emotions and affinity to items/services or goods. The image processor 511 receives pictures from the external sources, and analyzes and builds a description of entities in the pictures and correlations amongst the entities. For example, in analyzing a certain picture, the resulting description may be that of a user posing with a baby and new clothes. Then, the description interpreter 512 uses the description to analyze the underlying message and detect user's interests, emotions and affinity to items/services or goods. In the preceding example, the picture means that the user is proud, wants to share the happiness and is interested in baby items. This information can be stored in the database 53 with the user's profile, list of items and past transaction history. When another user wants to trade an item, the trading matching component 52 can retrieve the user profile from the database 53 and can recommend a ranked list of other users with items or intermediary trade steps.

Embodiments of the disclosure can use computer vision algorithms, such as conditional random fields for image segmentation and label prediction, a convolution neural network for feature extraction and a classifier such as a support vector machine (SVM), to process a picture and define a description of the items and correlations of the picture, and use natural language processing (NLP) to construct the sentence or description.

According to an embodiment of the disclosure, the description interpreter can use a supervised machine learning algorithm that detects the interests, emotions, affinity and motivations. Training data would include a description of a set of pictures and an interpretation that can be based on psychology-based methodologies. The supervised learning algorithm learns from the training corpus and produces an inferred function, which can be used to analyze new pictures from user sources. In other embodiments, unsupervised machine learning algorithms or statistically-based learning algorithms can be used. Supervised machine learning techniques include, but are not limited to, decision trees, support vector machines, neural networks, case based reasoning, and k-nearest neighbors algorithms. Unsupervised machine learning techniques include, but are not limited to, self-organizing maps, k-means, and expectation-maximization algorithms. Statistic-based machine learning techniques include, but are not limited to, logistic regression, naive Bayesian inference, discriminant analysis, and isotonic separation. Other suitable machine learning techniques include, but are not limited to, genetic algorithms, group methods, fuzzy sets, and rules-based methods.

According to another embodiment of the disclosure, a dictionary 55 can be created in which each word created in the image processing is compared with the dictionary. The words will be evaluated and weighted based on a pre-defined set of categories that define the emotions, affinity, motivations and interest. Examples of categories include anger, pleasure, pride, etc.

Figure 6:
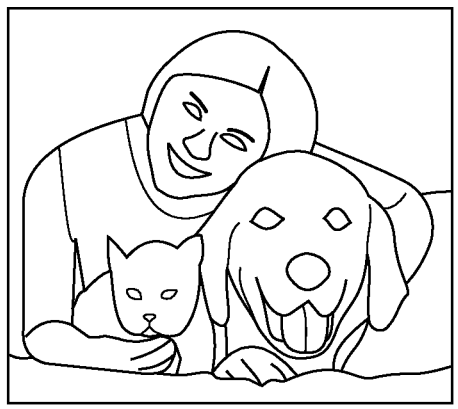
FIG. 6 is a photo of a person holding a pet, according to an embodiment of the disclosure.

For example, FIG. 6 is a photo of a person holding a pet. The image processor 511 can produce a description of the photo, and the description interpreter 512 can use a text analyzer to extract and evaluate words in the description based on the dictionary. For example, the description interpreter 512 can interpret the photo as meaning "You have a kind heart and are very caring person. You clearly love your pet a lot." This interpretation can be stored with the user's profile, list of items and past transactions in database. The description interpreter 512 can also weight emotions and affinities: e.g., kind heart (weight 0.7), caring person (weight 0.8) and love (weight 0.65). A trading system according to an embodiment of the disclosure can use this information when a user starts a new transaction to recommend a list of users and items to trade.

Figure 7:
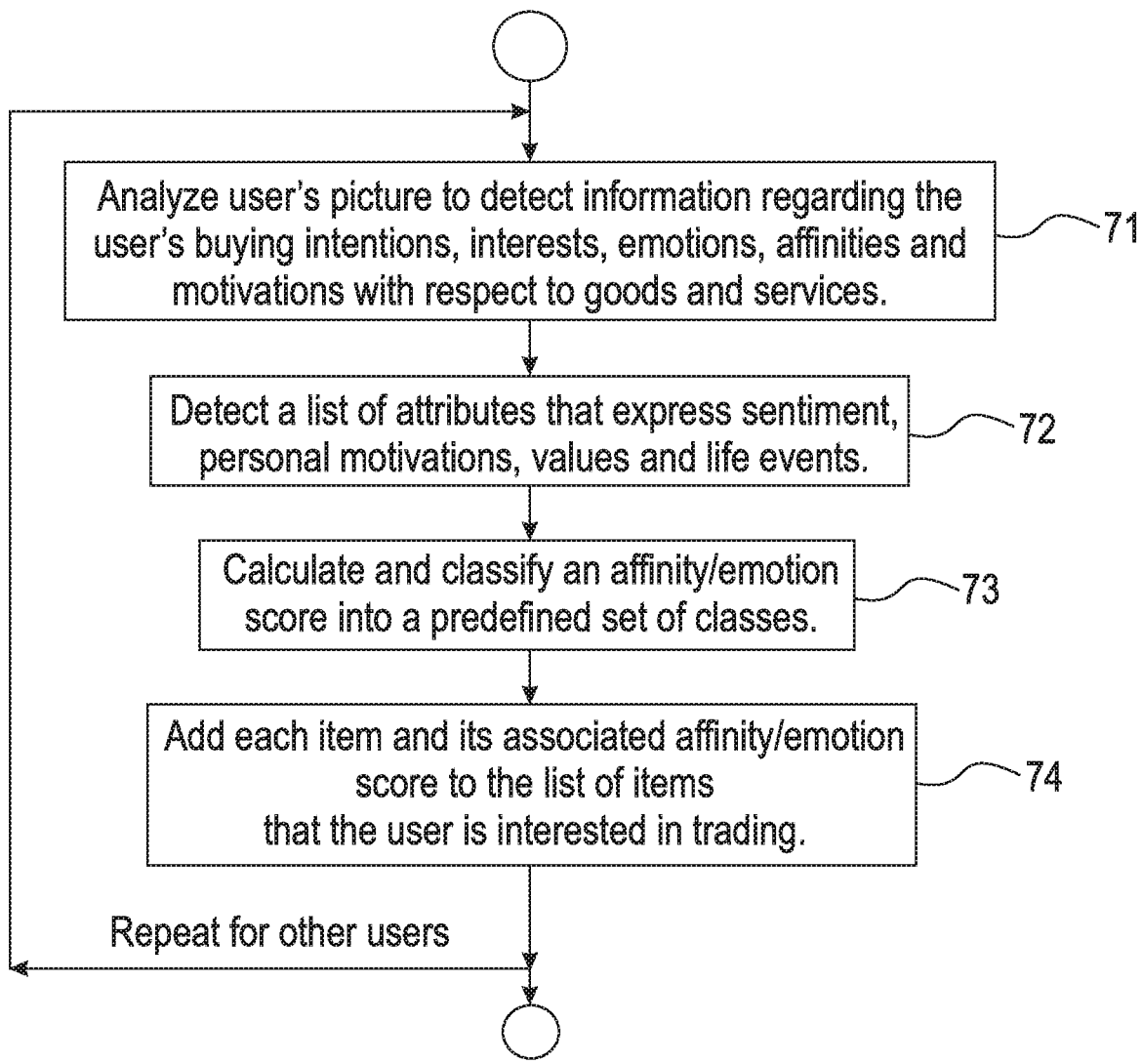
FIG. 7 presents a flowchart of a method for detecting items, intentions, and motivations using a computer network, according to an embodiment of the disclosure.

FIG. 7 presents a flowchart of a method according to an embodiment of the disclosure for detecting items, intentions, and motivations using a computer network. In a method according to an embodiment of the disclosure, a user has an associated list of items that the user is interested in trading or acquiring, and the user's posted pictures have been retrieved from an external data source, such as a social media website or social network. Referring now to the figure, a method according to an embodiment of the disclosure begins at step 71 by analyzing a user's picture to detect information items regarding the user's interests, emotions and affinities to goods and services. The method analyses the image and then creates a description using natural language processing and then analysis the description to detect buying intentions, interests, emotions, affinity and motivations. The method then continues at step 72 by detecting for each information item and associated picture a list of attributes that express sentiment, personal motivations, values and life events that may affect the user's trading decision for each item. At step 73, for each item in the item's list of attributes, an affinity/emotion score is calculated, and the score is classified into a predefined set of classes based on the values of the score, and at step 74, each item and its associated affinity/emotion score is added to the list of items that the user is interested in trading. Steps 71 to 74 can be repeated for other users.

Figure 8:
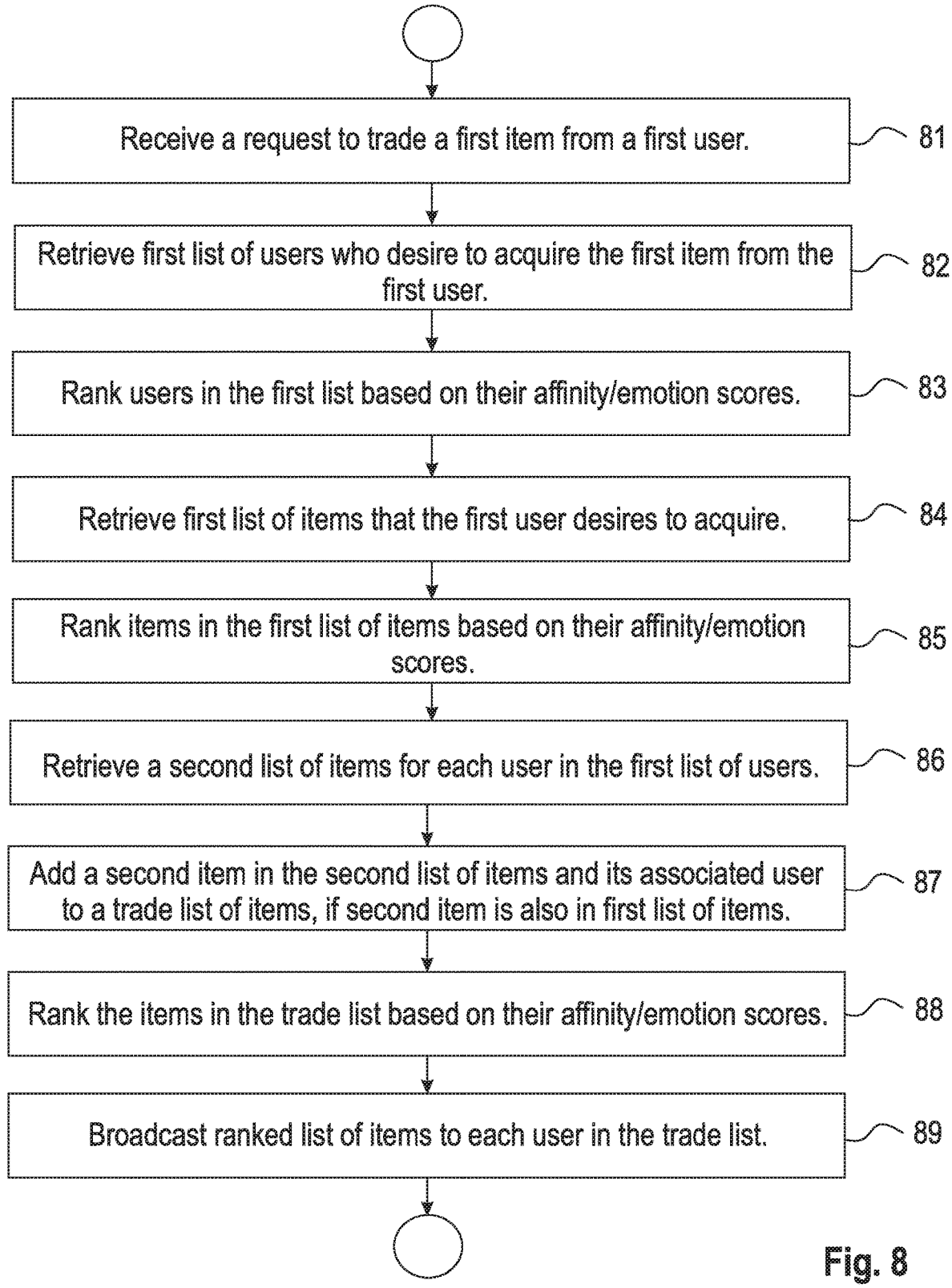
FIG. 8 presents a flowchart of a method for trading over a computer network, according to an embodiment of the disclosure.
Figure 9:
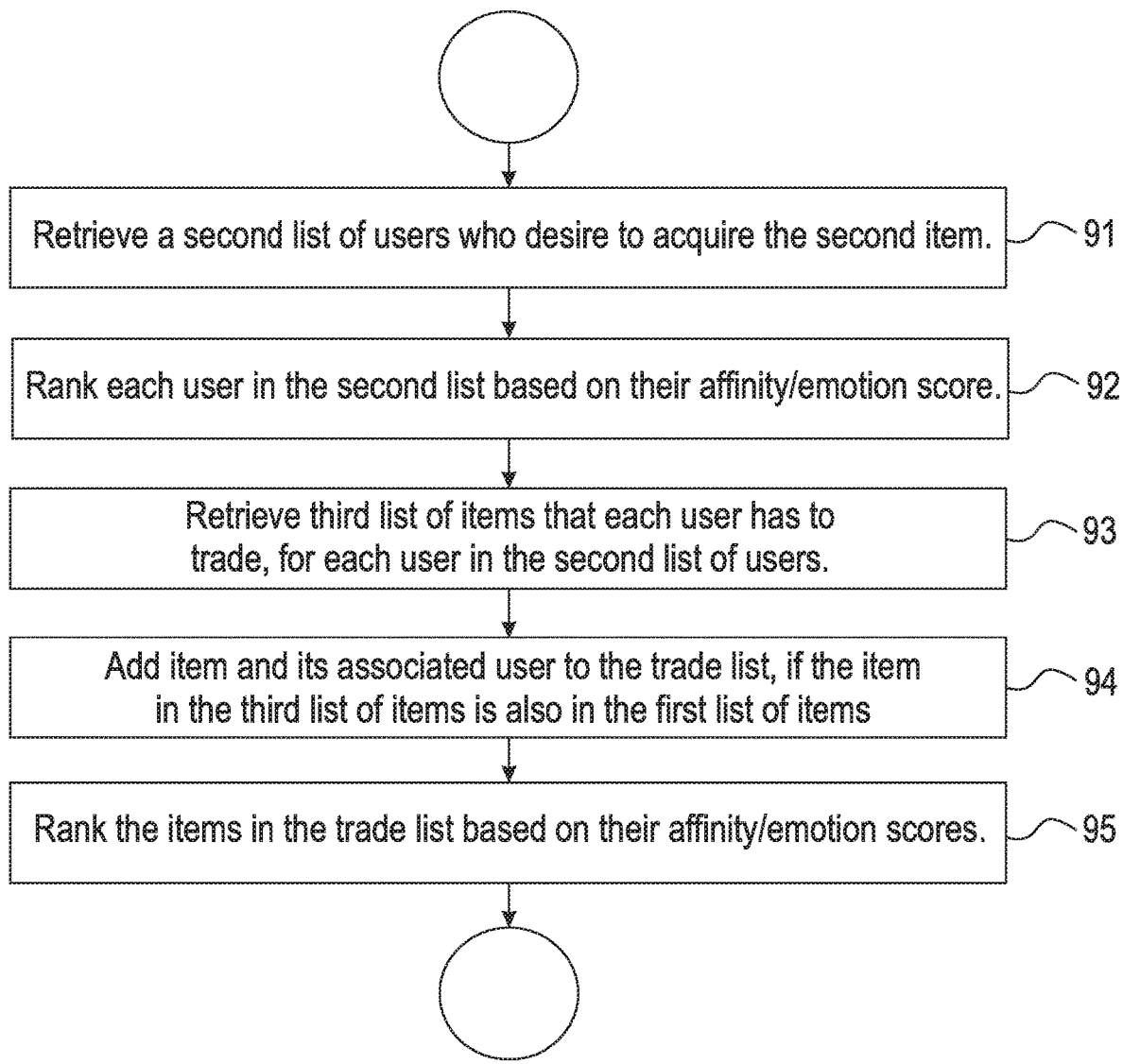
FIG. 9 presents a flowchart of a method of intermediary trading, according to an embodiment of the disclosure.

FIG. 8 presents a flowchart of a method according to an embodiment of the disclosure for trading over a computer network. Referring now to the figure, a method according to an embodiment of the disclosure begins at step 81 by receiving, from a first user, a request to trade a first item containing a description. A first list of users who desire to acquire the first item from the first user is retrieved at step 82, and the users in the first list are ranked at step 83 based on a user affinity/emotion score for each user in the first list, for user's whose affinity/emotion score is higher than a first predefined threshold. According to an embodiment, the first list of users can be retrieved from the database. At step 84 a first list of items that the first user desires to acquire is retrieved, and items in the first list of items are ranked at step 85 based on an item affinity/emotion score for each item, for items whose affinity/emotion score is higher than a second predefined threshold. According to an embodiment, the first list of items can be retrieved from the database. At step 86, a second list of items is retrieved for each user in the first list of users. This second list of items is a list of items that each user in the first list of users has to trade. According to an embodiment, the second list of items can be retrieved from the database. For each item from the second list, if a second item in the second list of items is also in the first list of items and if the item's affinity/emotion score is higher than the second predetermined threshold, the second item its associated user and the affinity/emotion score is added at step 87 to a trade list of items that can be traded. Otherwise, the method in FIG. 9 is called to add items, users and the affinity/emotion score in the trade list of items that can be traded. At step 88 the items in the trade list are ranked based on the item affinity/emotion score of each item, and the ranked list of items is broadcast to each user in the trade list, at step 89. Users in the trade list can then negotiate with each other until a consensus is reached.

For a second item not in the first list of items or whose affinity/emotion score is less than the second predetermined threshold, embodiments of the disclosure provide a method of intermediary trading, illustrated in the flowchart of FIG. 9. Referring now to the figure, a method of intermediary trading according to an embodiment of the disclosure begins at step 91 by retrieving a second list of users who desire to acquire the second item, and ranking each user in the second list of users at step 92 based on the user's affinity/emotion score, for each user whose affinity/emotion score higher than the first threshold. According to an embodiment, the second list of users can be retrieved from the database. At step 93, for each user in the second list of users, a third list of items that each user has to trade is retrieved, and at step 94, if an item in the third list of items is also in the first list of items, the item, its associated user and the affinity/emotion score are added to the trade list and ranked at step 95 based on the item affinity/emotion score. According to an embodiment, the third list of items can be retrieved from the database.

Embodiments of the present disclosure can be implemented in the cloud. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming to languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 10:
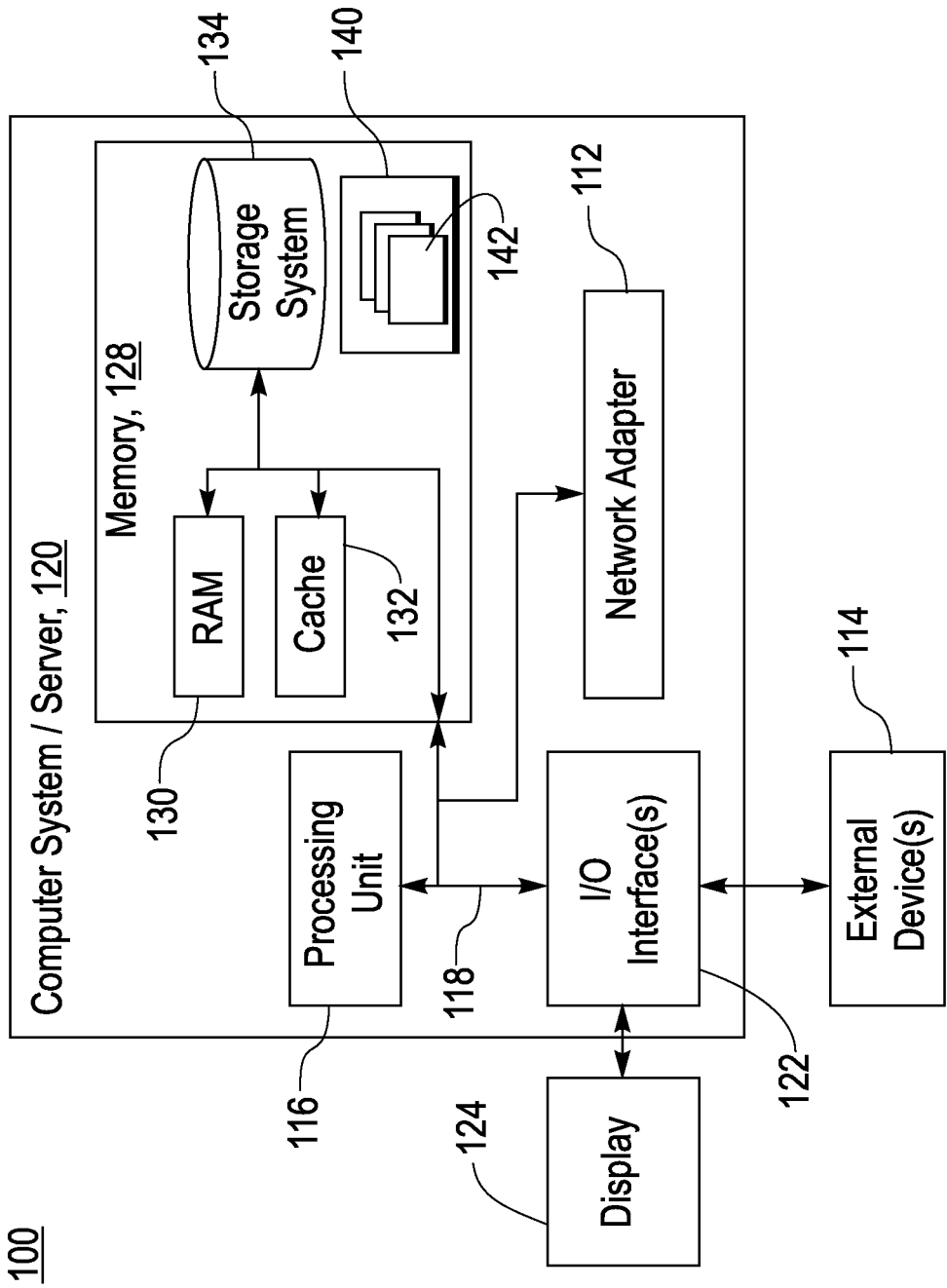
FIG. 10 depicts a cloud computing node according to an embodiment of the present disclosure.

Referring now to FIG. 10, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 120, which is operational with numerous other general purpose or special purpose computing system environments or configurations. Examples of well-known computing systems, environments, and/or configurations that may be suitable for use with computer system/server 120 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 120 may be described in the general context of computer system executable instructions, such as program modules, being executed by a computer system. Generally, program modules may include routines, programs, objects, components, logic, data structures, and so on that perform particular tasks or implement particular abstract data types. Computer system/server 120 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 120 in cloud computing node 100 is shown in the form of a general-purpose computing device. The components of computer system/server 120 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 120 typically includes a variety of computer system readable media. Such media may be any available media that is accessible by computer system/server 120, and it includes both volatile and non-volatile media, removable and non-removable media.

System memory 128 can include computer system readable media in the form of volatile memory, such as random access memory (RAM) 30 and/or cache memory 132. Computer system/server 120 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 120 may also communicate with one or more external devices 114 such as a keyboard, a pointing device, a display 124, etc.; one or more devices that enable a user to interact with computer system/server 120; and/or any devices (e.g., network card, modem, etc.) that enable computer system/server 120 to communicate with one or more other computing devices. Such communication can occur via Input/Output (I/O) interfaces 122. Still yet, computer system/server 120 can communicate with one or more networks such as a local area network (LAN), a general wide area network (WAN), and/or a public network (e.g., the Internet) via network adapter 112. As depicted, network adapter 112 communicates with the other components of computer system/server 120 via bus 118. It should be understood that other hardware and/or software components could be used in conjunction with computer system/server 120. Examples, include, but are not limited to: microcode, device drivers, redundant processing units, external disk drive arrays, RAID systems, tape drives, and data archival storage systems, etc.

Figure 11:
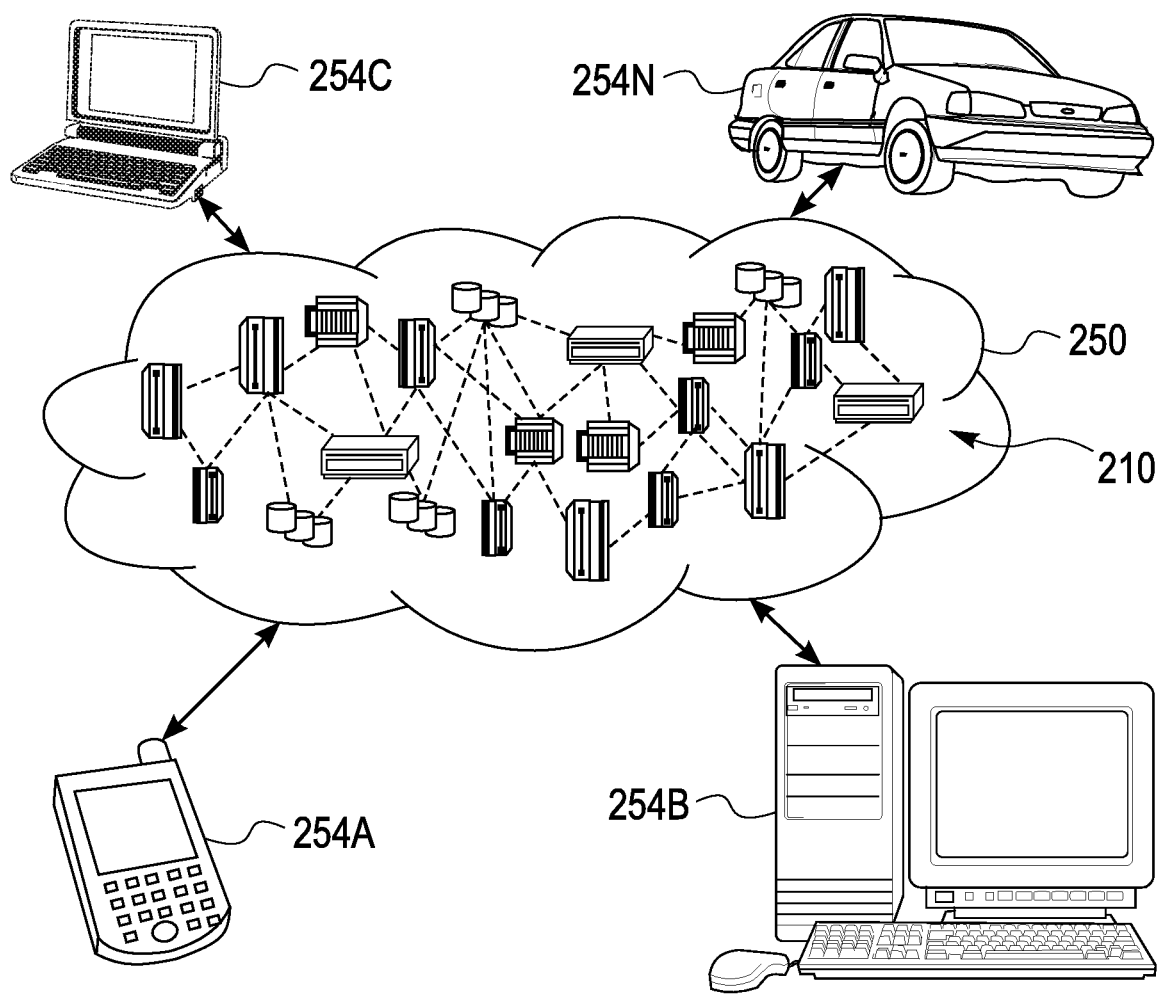
FIG. 11 depicts a cloud computing environment according to an embodiment of the present disclosure.

Referring now to FIG. 11, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 11 are intended to be illustrative only and that computing nodes 210 and cloud computing environment 250 can communicate with any type of computerized device over any type of network and/or network addressable connection (e.g., using a web browser).

Figure 12:
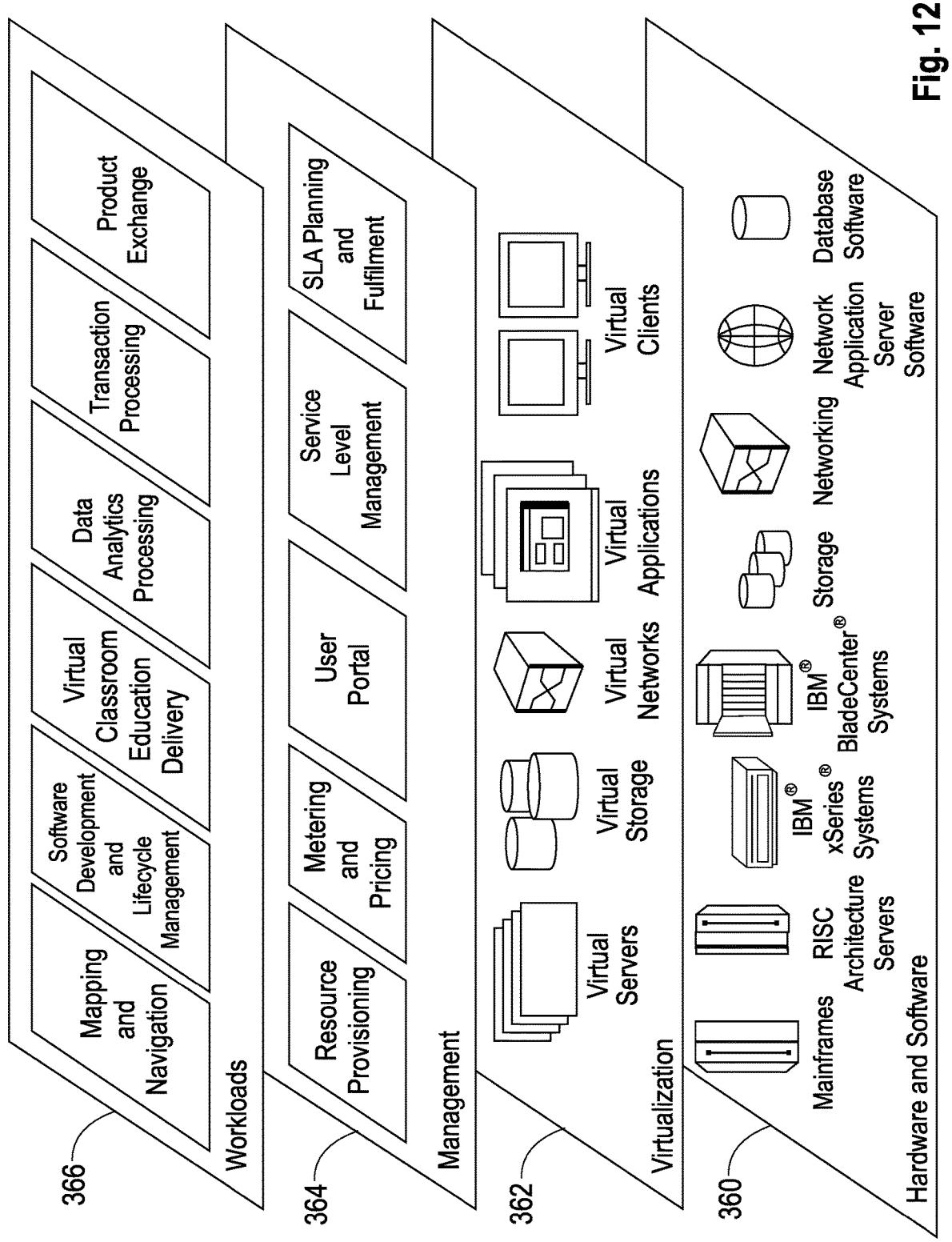
FIG. 12 depicts abstraction model layers according to an embodiment of the present disclosure.

Referring now to FIG. 12, a set of functional abstraction layers provided by cloud computing environment 250 of FIG. 11 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a product exchange system for trading goods over a computer network.

What is claimed is:

1. A non-transitory program storage device readable by a computer, tangibly embodying a program of instructions executed by the computer to perform the method steps for trading on a computer network, the method comprising the steps of:
   receiving from a first user a request to trade a first item;
   retrieving a first list of users with intention to acquire the first item from the first user;
   retrieving a first list of items that the first user has intention to acquire;
   retrieving for each user in the first list of users a second list of items that each said user has to trade;
   generating said second list of items that each said user has to trade by analyzing a picture received from each said user to build a description of entities in the picture and correlations among the entities;
   analyzing the description to determine an underlying message in the picture and detect information regarding the user's interests, emotions and affinities to goods and services, wherein the information is stored with a profile of the user, a list of items to trade of the user, and a past transaction history of the user; and
   using the detected information regarding the user's interests, emotions and affinities to goods and services and producing a ranked list of other users with items to trade, when another user initiates a new trading transaction.

2. The computer readable program storage device of claim 1, the method further comprising storing in a database the information regarding the user's interests, emotions and affinities to goods and services, with the user's profile, the user's list of items to trade, and the user's past transaction history.

3. The computer readable program storage device of claim 1, the method further comprising
   using a machine learning algorithm that detects the user's interests, emotions and affinities to goods and services, wherein the machine learning algorithm is trained using descriptions and interpretations of a set of pictures to produce an inference function that can analyze new pictures from user sources.

4. The computer readable program storage device of claim 1, the method further comprising using natural language processing to analyze the description.

5. The computer readable program storage device of claim 1, the method further comprising
using computer vision algorithms to build the description of entities in the picture and correlations among the entities, wherein said computer vision algorithms include conditional random fields for image segmentation and label prediction, a convolution neural network for feature extraction, and a support vector machine for classification.

6. The computer readable program storage device of claim 1, the method further comprising:
using a text analyzer to extract and evaluate each word in the description created by the image processor,
comparing each word with a dictionary, and
evaluating and weighting each word based on a predefined set of categories that define the user's interests, emotions and affinities to goods and services.

7. The computer readable program storage device of claim 1, the method further comprising:
ranking users in the first list of users based on a user affinity/emotion score for each user, wherein the user affinity/emotion score is higher than a first predefined threshold;
ranking items in the first list of items based on an item affinity/emotion score for each item, wherein the item affinity/emotion score is higher than a second predefined threshold;
adding a second item in the second list of items, the user and affinity/emotion score associated with said second item to a trade list, if said second item is also in the first list of items and if the item affinity/emotion score of said second item is higher than the second predetermined threshold; and
ranking the items in the trade list based on the item affinity/emotion score of each item.

8. The computer readable program storage device of claim 7, the method further comprising broadcasting the ranked list of items to each user in the trade list.

9. The computer readable program storage device of claim 7, the method further comprising, if the second item in the second list of items is not in the first list of items:
retrieving a second list of users with intention to acquire the second item;
ranking each user in the second list of users based on a user affinity/emotion score for each said user, wherein the user affinity/emotion score j higher than the first threshold;
retrieving for each user in the second list of users a third list of items that each said user has to trade;
adding an item in the third list of items, the user and affinity/emotion score associated with said item to the trade list, if said item is also in the first list of items; and
ranking the items in the trade list based on the affinity/emotion score of each item.

* * * * *